United States Patent

[11] 3,603,691

| | | |
|---|---|---|
| [72] | Inventor | Ralph A. Hamilton, Glendale, Calif. |
| [21] | Appl. No. | 844,952 |
| [22] | Filed | July 25, 1969 |
| [45] | Patented | Sept. 7, 1971 |
| [73] | Assignee | Lockheed Aircraft Corporation, Burbank, Calif. |

[54] LASER CONTROL FOR AUTOMATIC ALIGNMENT OF STRUCTURES
20 Claims, 7 Drawing Figs.

[52] U.S. Cl. .................................................. 356/152, 250/211, 250/215, 250/234, 318/640, 356/172, 214/1
[51] Int. Cl. ...................................................... G01b 11/26
[50] Field of Search ............................................ 356/141, 152, 172; 318/640; 250/211, 231 GY, 234; 214/1 CM

[56] References Cited
UNITED STATES PATENTS

| 3,316,800 | 5/1967 | Kibler.......................... | 356/152 |
| 3,470,377 | 9/1969 | Le Fabre et al................ | 356/172 |
| 3,486,826 | 12/1969 | Colvin et al.................. | 356/152 |
| 3,502,415 | 3/1970 | Hock........................... | 356/172 |

Primary Examiner—Rodney D. Bennett, Jr.
Assistant Examiner—Stephen Buczinski
Attorneys—George C. Sullivan and Ralph M. Flygare ABSTRACT: An automatic part positioning system, such as may be used in tool or jig building, precisely locates or aligns the assembly components of large structures. Any misalignment of a component, with respect to a given spatial reference, is detected and appropriate error signals are generated which control a servosystem to move the component into alignment through three rectilinear axes and three angular axes, as required. These six degrees of freedom are referenced to one or more laser beams which establish the system's spatial reference. Multiple photoelectric targets, secured to the assembly component for movement therewith, respond to the laser beams to generate the necessary translational or rotational control signals for operation of the servosystem. Activation of the servosystem automatically brings the assembly component into a given position with respect to the system's basic spatial reference and thereafter maintains the established alignment.

FIG_1

FIG_3

FIG_4

INVENTOR.
RALPH A. HAMILTON

FIG_7

3,603,691

LASER CONTROL FOR AUTOMATIC ALIGNMENT OF STRUCTURES

BACKGROUND OF THE INVENTION

There is described in my copending application Ser. No. 517,644 filed Dec. 30, 1965, entitled Laser Beam Alignment Apparatus, a system which will permit accurate orientation of structural subassemblies with respect to a main structure by use of a light beam projected from a laser onto a multielement, photoelectric target. This prior system is entirely satisfactory for semiautomatic positional control in a two-axis Cartesian coordinate system. Other two-dimensional alignment systems, representative of the prior art, are also disclosed in U.S. Pats. Nos. 2,952,779; 3,229,099; and 3,323,108. However, the need frequently arises for a system which will permit positional location and alignment through six degrees of freedom. The implementation of a triaxial system involves a number of problems which cannot be solved by the mere extension of the aforementioned two-axis systems. For example, in the absence of suitable control logic, a multiple axis system could permit the generation of opposing positioning forces tending to bend or distort the parts to be positioned. Other improvements over the prior art are contained in the present invention, as will be discussed hereinafter.

SUMMARY OF THE INVENTION

The capability of positioning a part in three-dimensional space is provided by the present invention, and moreover provides a fully automatic system for initially establishing the part in space with respect to a desired location and thereafter maintaining a desired alignment at the established location. The automatically controlled servomechanisms of the invention provide power-driven means for handling heavy, bulky, or otherwise cumbersome parts which could not readily be handled manually. The present invention is particularly applicable to aircraft tooling in which a jug fitting is to be properly located relative to a jig frame, and retained in place while being permanently secured to the frame. The completed structure may then be used to locate a wing rib, fuselage bulkhead, or other component requiring critical location in a major aircraft part assembly. The present invention replaces conventional optical tooling and manual operating methods heretofore employed in a jig building and like procedures. Station location of a detail part is accomplished through the use of a plurality of photoelectric targets which are responsive to fixed and movable laser beams comprising basic and auxiliary lines of sight. Each photoelectric target comprises either a bisector or a quadrisector photoelectric sensor, depending upon the nature of the translational or rotational displacement to be sensed. In a typical construction three bisector targets are used for station location (four bisector targets would undesirably permit the generation of opposing forces tending to bend or distort the part).

The novel optical system of the present invention permits the projection of laser beams small enough to provide the desired accuracy over distances of 400 feet or more. In a typical construction, displacements of ±0.005 inches may be detected at a distance of 200 feet. The laser beam employed as the reference line of sight is subject to the same refractive deviations as is ordinary (noncoherent) light and may (over long distances) shift its position slightly due to air turbulence or thermal effects. However, the novel photoelectric sensing of the laser beam in accordance with the present invention permits measurement of the beam's mean position to a degree which is more reliable and more accurate than could be obtained by human judgement. The novel laser projector of the present invention comprises a fixed-focus instrument which does not require precision focusing slides such as those found in optical-tooling devices of the prior art.

In summary, this invention obviates the deficiencies and shortcomings of prior optical alignment systems and provides for automatic, precision alignment of structures, tooling jigs, support members and the like through six possible degrees of freedom.

It is therefore an object of the present invention to provide novel and improved apparatus for the spatial location and alignment of structures with respect to a plurality of given reference lines.

Another object of the invention is to provide novel and improved alignment apparatus employing multiple photoelectric targets responsive to reference light beams.

It is another object of the invention to provide novel and improved automatic alignment apparatus which will position a given part through six degrees of freedom (three angular or three rectilinear, or both) and thereafter maintain a desired spatial position.

Yet another object of the invention is to provide novel and improved alignment apparatus which will permit substantial savings in time in the construction of precision assemblies and an improvement in the accuracy of the spatial location of the assembly components.

Still another object of the invention is to provide novel and improved apparatus for the automatic alignment of structures which overcomes disadvantages and shortcomings of prior devices employed heretofore to achieve generally similar purposes.

Figures 1, 3, 4:
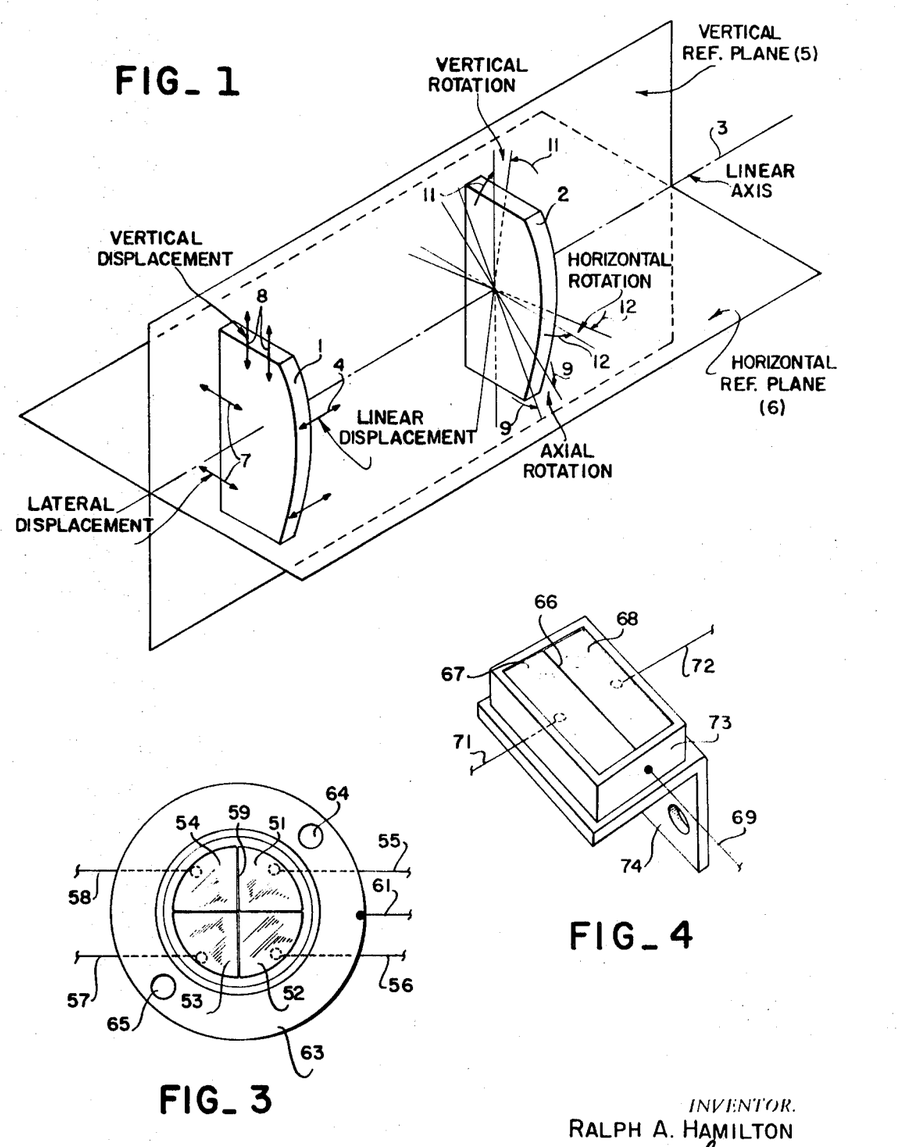
FIG. 1 is a schematic representation of a pair of jig fittings illustrating the six degrees of freedom through which such fittings may be moved.
FIG. 3 is a front elevation view of a quadrisector photoelectric target of the type employed in the practice of the invention.
FIG. 4 is a perspective view of a bisector photoelectric target useful in the practice of the invention.

DESCRIPTION OF THE PRESENTLY PREFERRED EMBODIMENTS displacement is shown in FIG. 1 a schematic representation of a pair of jig fittings 1 and 2 which may be selectively positioned in space through six degrees of freedom in order to ultimately achieve the desired location. These six degrees of freedom are schematically illustrated to provide a clear visualization of the function of the present invention. Movement of fittings 1 and 2 are representatively illustrated as being aligned on a common linear axis indicated by line 3. Movement of either of the fittings 2 or 3 along this linear axis (3) is normally referred to as "linear" displacement as indicated by arrow 4. Mutually perpendicular vertical and horizontal reference planes (5 and 6, respectively) are similarly illustrated, the line of intersection of these planes being the aforementioned linear axis 3. Movement of the fittings along the horizontal plane 6 normal to the linear axis 3 is termed "lateral" displacement (indicated by arrow 7) and movement along the vertical plane 5 normal to the linear axis 3 is termed "vertical" displacement (indicated by arrow 8). Rotation about the linear axis 3 is termed "axial" rotation and is indicated by arrows 9. Rotation in the vertical plane 5 about a horizontal axis (not shown) is "vertical" rotation and is indicated by arrows 11. Rotation in the horizontal plane about a vertical axis (not shown) is considered to be horizontal rotation as indicated by arrows 12. Each of these spatial displacements and rotations is referred to as a degree of freedom and each is illustrated in FIG. 1. These terms are used throughout this specification as descriptive of the movements accomplished by the present invention in its various phases of operation.

Figure 2:
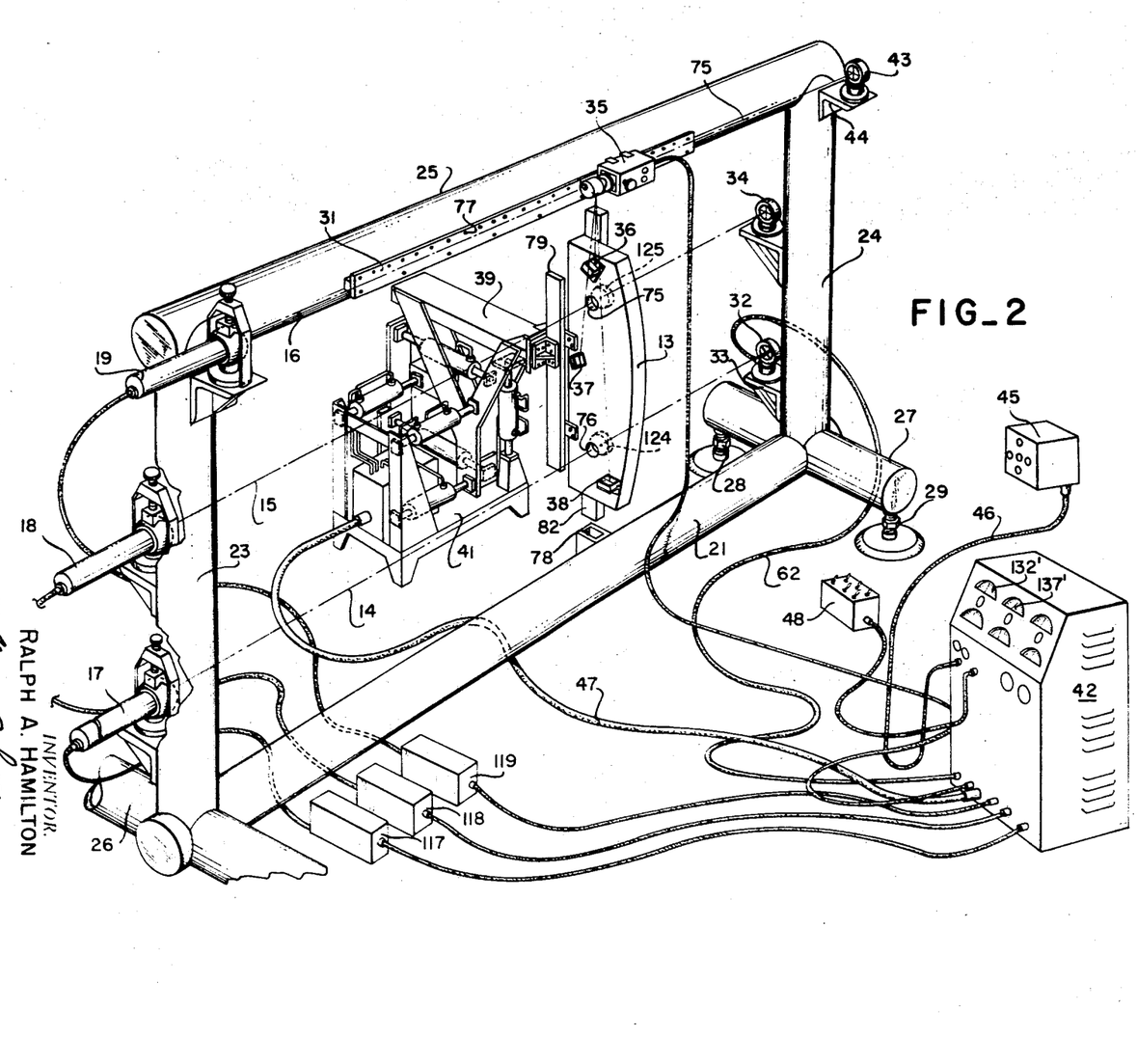
FIG. 2 is a perspective view of one embodiment of the apparatus showing the multiple laser projectors and their corresponding photoelectric targets, together with the control and servomotor components.

Referring specifically to FIG. 2 there is shown a typical embodiment of apparatus suitable for carrying out the method of the invention. In order to locate a detail component 13 at a preselected loft point, it is necessary to establish the origin of the three previously mentioned orthogonally intersecting reference planes. Origin location is accomplished by means of three laser beams 14–16 which define two orthogonal planes. The beam from laser projector 17 comprises the basic line of sight (viz., beam 14), which line is common to both planes. Laser projector 18 generates the auxiliary line of sight (viz, beam 15) and defines the vertical reference plane in conjunction with laser projector 17. The orthogonal "station" reference plane is derived from the beams of laser projectors 17 and 19. Both vertical (up and down) and horizontal (right and left) translation is controlled by the basic line of sight (14), whereas axial rotation around the basic line of sight (14) is controlled by the auxiliary line of sight (15). Horizontal rotation, vertical rotation, and linear station locations are controlled by the third laser beam 16 which is scanned in a station plane in a manner to be described more fully hereinafter.

In a typical construction of the apparatus, a jig frame 21 is employed having a plurality of jig fittings thereon and in which the present invention is used to align and retain the fittings while being permanently secured to the frame 21. The frame 21 is of rectangular form having base member 22, upright members 23 and 24, and top cross member 25. Outrigger members 26 and 27 are each provided with depending adjustable legs, two of which are identified as 28 and 29. Heretofore, jog building has been accomplished by optical tooling and manual techniques. By means of the apparatus to be described hereinafter, visual positioning is accomplished by means of a plurality of hydraulic actuators which may be operated individually or in combination under the control of the laser alignment control.

As shown in FIG. 2, the jig frame 21 has a suitable tooling bar 31 adjustably secured to the top cross member 25. The basic line of sight 14, established by the modulated laser beam from projector 17, is directed to quadrisector photoelectric target 32, which is secured to the jig frame 21 by means of an associated bracket 3. The auxiliary line of sight (15) from laser projector 18 is projected onto end target 34. Linear stations are established by means of the linear station laser projector a9 and the linear station scanner 35 which generates a projected plane which is intercepted by bisensor targets 36–38. Structural details of the station scanner will be described more fully hereinafter in connection with FIG. 4. The component 13 which is to be oriented with respect to the jig frame 21 is temporarily secured to the positioning bar 79 of the hydraulic positioner, indicated generally at 41. The hydraulic positioner 41 comprises an electrohydraulic servomechanism capable of moving the component 13 through six degrees of freedom and maintaining the desired ultimately achieved position during structural connection procedures, under the command of electric input control signals. A suitable mechanism for accomplishing this positioning function is described in detail in my U.S. Pat. No. 3,291,321, entitled Hydraulic Positioner, and of common assignee with the present application.

The necessary electrical control signals for operating the hydraulic positioner 41 are obtained via the positioner control console 42, and are derived from the electrical outputs from targets 32, 34, and 36–38. Cable 47 interconnects console 42 with the hydraulic positioner 41. Target 43 is fixedly secured to member 24, by means of bracket 44, and is used in certain alignment procedures, to be described hereinafter.

Prior to the installation of the component 13 it is desirable to establish the above-mentioned lines of sight in order to calibrate the system. This is accomplished by means of a beam alignment indicator 45 which is connected to console 42 via cable 46. The beam alignment indicator 45 provides a visual display to the operator as to the pointing of the projected laser beam with respect to its reference target. The use of the beam alignment indicator 45 will be described more fully in a subsequent part of this specification. The photoelectric reference target 32 (shown in detail in FIG. 3) for the basic line of sight projector 17 comprises four quadrant sectors, aligned as shown in FIG. 2.

Each of the light responsive targets 32, 34 and 43 is divided into four quadrants and each quadrant has an individual electrical output. In FIG. 3, quadrant sectors 51–54 are connected to respective ones of lines 55–58. The quadrants are 90° sectors of a circle and preferably have a physical separation, shown at 59, which is as small as possible coincident with the requirements for electrical isolation of the sectors 51–54.

To establish the basic line of sight (14) the quadrisector target 32 is initially aligned by means of a mechanical indexing system. In a typical construction the target 32 is 1⅛-inch in diameter and each sector is provided with a separate output line (e.g., 55–58) and all four sectors have a common ground lead 61. Lines 55–58 and ground lead 61 comprise cable 62 which connects to console 42. The protective housing 63 for the photocells may be provided with mounting pin holes 64–65 having dimensions corresponding to conventional optical-tooling standards. Fine positioning is obtained by adjusting the projector 17 or the target 32 so that the intersection of the four target sectors 51–54 intercepts the center of the laser beam 14.

The photoelectric targets 36–38 which are responsive to the linear station scanner 35, comprise bisensor targets which differ from the previously described quadrant-sector sensors (32, 34 and 43) by the fact that they have but two sensitive sectors. This arrangement is shown in FIG. 4. The line 66 isolating the two sectors 67 and 68 may run either horizontally or vertically as determined by their use in the system. Lines 71 and 72 connect to respective ones of sectors 67 and 68. Ground lead 69 is common to both sectors (67 and 68) and is connected to housing 73. The bisensor targets may be secured to the station face of the fitting or component 13 by means of bracket 74. The relation of targets 36–38 to the linear station laser (19) scan will provide all necessary linear locations In the example shown in FIG. 1, three bisensor targets 36–38) are secured on the station face of the component 13, but this number is dictated by the size of the component and the desired degree of accuracy.

Figure 5:
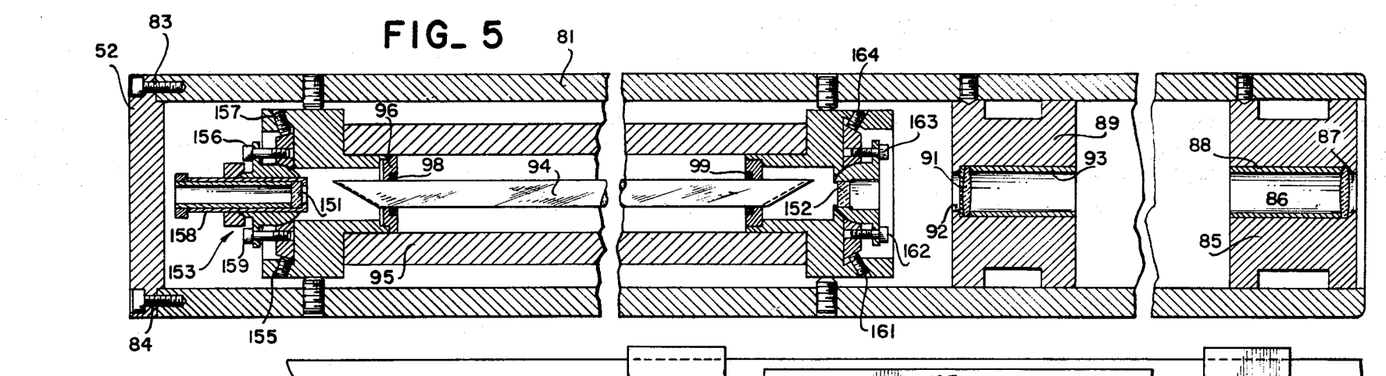
FIG. 5 is a longitudinal cross section view, partially broken away, of the laser projector portion of the apparatus.

The laser projectors 17–19, in a typical construction, are housed in a cylindrical barrel 81 having a diameter of 2.250 inches which is compatible with standard optical-tooling mounts and accessories. This arrangement is shown in FIG. 5. The projector comprises a low-powered gas laser which is operated in conjunction with an ancillary modulation circuit to be described in greater detail in conjunction with the description of FIG. 7, to provide an output beam which cyclically varies in intensity. The barrel 81 is precision ground on its outside diameter to conform to standard optical tooling dimensions, thus assuring interchangeability with conventional tooling instruments. One end of the barrel is enclosed by cap 82 which is secured to the barrel 81 by screws 83 and 84, or other suitable fasteners. The opposite end carries lens mounting 85 for supporting far field focusing lens 86. The lens 86 is retained within a central aperture 87 by means of retaining tube 88. Lens mount 89 carries beam expander lens 91 which is retained within central aperture 92 by retaining tube 93. Plasma tube 94 is supported within laser insert tube 95 by means of dust rings 96 and 97 which carry O-ring seals 98 and 99, respectively. The laser cavity reflectors comprise flat reflector 151 and spherical reflector 152. Reflector 151 is carried in a mounting assembly indicated generally at 153 which permits the reflector to be removed, replaced, and recentered by means of the adjustment screws 154–157. Longitudinal axial adjustment of reflector 151 may be made by axial adjustment of tube 158. Axial and angular adjustment of reflector 152 may be made by adjusting screws 161–164. Electrical connections to the electrodes within the plasma tube are provided, although they are not visible in FIG. 5. The plasma tube 94 is energized from a DC power supply (e.g., 117 of FIG. 2) and ignition or starting ionization is at approximately 5,000 volts. After ignition, the plasma is capable of conducting considerable current and for this reason a series resistor is employed to reduce the voltage applied across the plasma to approximately 1,700 volts.

Modulation of the laser beam is accomplished by means of a transformer having its secondary winding in series with the power supply to the plasma tube. The primary winding of this transformer is driven from an oscillator-amplifier which causes the luminous laser output to shift in intensity at a frequency of approximately 2,400 Hz. The modulation accrues to the very nonlinear characteristics common to gas filled plasma tubes of this general type.

If the voltage across the plasma tube 94 is slowly raised, conduction will occur when the ionization or striking voltage is reached. Thereafter, the current must be limited or the degree of current conduction would be high enough to destroy the tube. The above-mentioned series resistor limits the current to a proper value. Conduction after ionization exhibits a negative resistance characteristic in that for an increase in current there is a decrease in voltage across the tube.

A current threshold must also be reached to cause laser action; that is, at low current levels no light oscillation will be sustained. This current level and the deionization level of the tube determines the low limit of the modulation current swing.

As the modulation current is increased, the laser output is increased until a point is reached at which an increase in heat output will occur but not an increase in light output. An increase in the heat output will decrease the tube life; therefore, in practice this limits the maximum upward swing of the current level. Modulation must then be confined by the upper limit of light output together with a satisfactory tube life and a lower limit at the laser action threshold or tube deionization. In a practical construction, approximately 60 percent modulation may be obtained.

The linear stations are perpendicular to the basic line of sight and are measured by a means of a linear-tooling bar.

Initial positioning of the three lines of sight 14–16 and the suitable tooling bar 31 location may be done by the use of conventional optical-tooling methods, well known to those versed in the art. Once established these lines of sight remain fixed and may be used in automatically aligning any number of fixtures (e.g. 13) or fittings with respect to the basic jig frame 21.

Holes 75 and 76, 1½-inch in diameter are rough drilled through component 13 in the line of sight positions to permit the laser beams 14 and 15 to pass therethrough; this follows standard optical tooling practice. Photoelectric targets will be secured to the component 13 at the location of holes 75 and 76, at a particular step in operating procedure, to be described hereinafter.

The two reference lines of sight 14 and 15 are located with respect to the jig frame 21 in a conventional manner by means of plumb bobs, micrometers, transits, sight levels, etc. The first line of sight 14 controls the vertical and lateral placement of fittings. Line of sight 15 controls axial rotation about the first line of sight. The three additional possible adjustments are controlled by the optical plane which is normal to the first line of sight 14. It is obvious that this latter plane, which is established by scanning beam 16, will control vertical rotation, horizontal rotation, and linear station position. The linear position of this plane is determined by reference to the linear-tooling bar or "increment bar" 31 which, in accordance with standard practice, is bolted and dowelled to the jig frame 21.

The linear increment bar 31 is provided with a plurality of pin holes spaced at 5 inch intervals along its length. A typical one of these holes is indicated at 77. A plurality of linear stations may be generated which are perpendicular to the reference line of sight (14).

Figure 6:
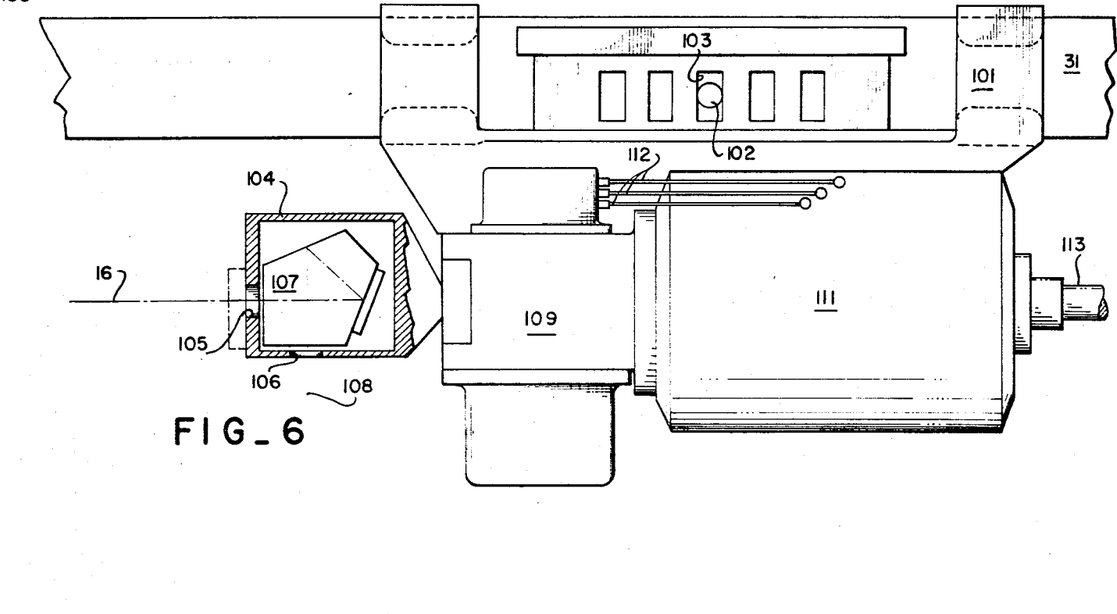
FIG. 6 is a fragmentary side elevation view, partially broken away, of the station-plane beam scanner portion of the system; and, FIG. 7 is a block diagram illustrating the overall system arrangement of the invention.

The station scanner identified as 35 in FIG. 2, is shown in FIG. 6 and is supported from the tooling bar 31 by a carriage 101. Incremental indexing is accomplished by means of an index pin 102 which extends from the tooling bar 31 and registers with a selected one of the indexing apertures on the station scanner 35. In FIG. 6 the index pin 102 is shown in registry with aperture 103. The indexing pins may be inserted in any selected indexing hole such as those shown at 77 in FIG. 2. The beam 16 projected from projector 19 enters housing 104 through aperture 105 and is redirected so as to exit through aperture 106, by means of pentaprism 107. Thus, the emerging beam 103 is normal to the entering beam 16. Housing 104 is shown broken away in FIG. 6, for clarity. The housing 104 is secured to the output shaft of a gear box 109 which permits rotation of the housing 104 about the axis of beam 16. Drive motor 111 is coupled to the housing 104 through gear box 109. A suitable brake, clutch and reversing mechanism is contained in gearbox 109 so as to permit cyclical rotation in either direction of housing 104 about the axis of beam 16. Direction reversing, braking, and clutch control is accomplished via lines 112 which connect to power and control cable 113. This arrangement permits the entrance beam 16 to be cyclically swept through an arc which will generate a plane normal to the axis of beam 16. When the scanning beam impinges on any one of the targets 36–38, the clutch is released and a brake is applied to quickly stop the movement of the beam and lock it onto the face of the target. A timing circuit in the control console 42 holds the brake "on" for about 6 seconds to permit the control circuits and the positioner 41 to respond. While the beam is stopped on any target the electrical output of that target, after being processed by the system to be described in connection with FIG. 7, directs the positioner 41 to make the necessary movements to bring the component 13 to its zero or balanced position with respect to the beam. Thereafter, the brake is released, the clutch reengaged and the beam caused to scan to the next adjacent target. This cycle is repeated to cause the beam to sweep back and forth across the three station targets 36–38 in intermittent steps. This function will be more fully explained in conjunction with the description of FIG. 7.

Figure 7:
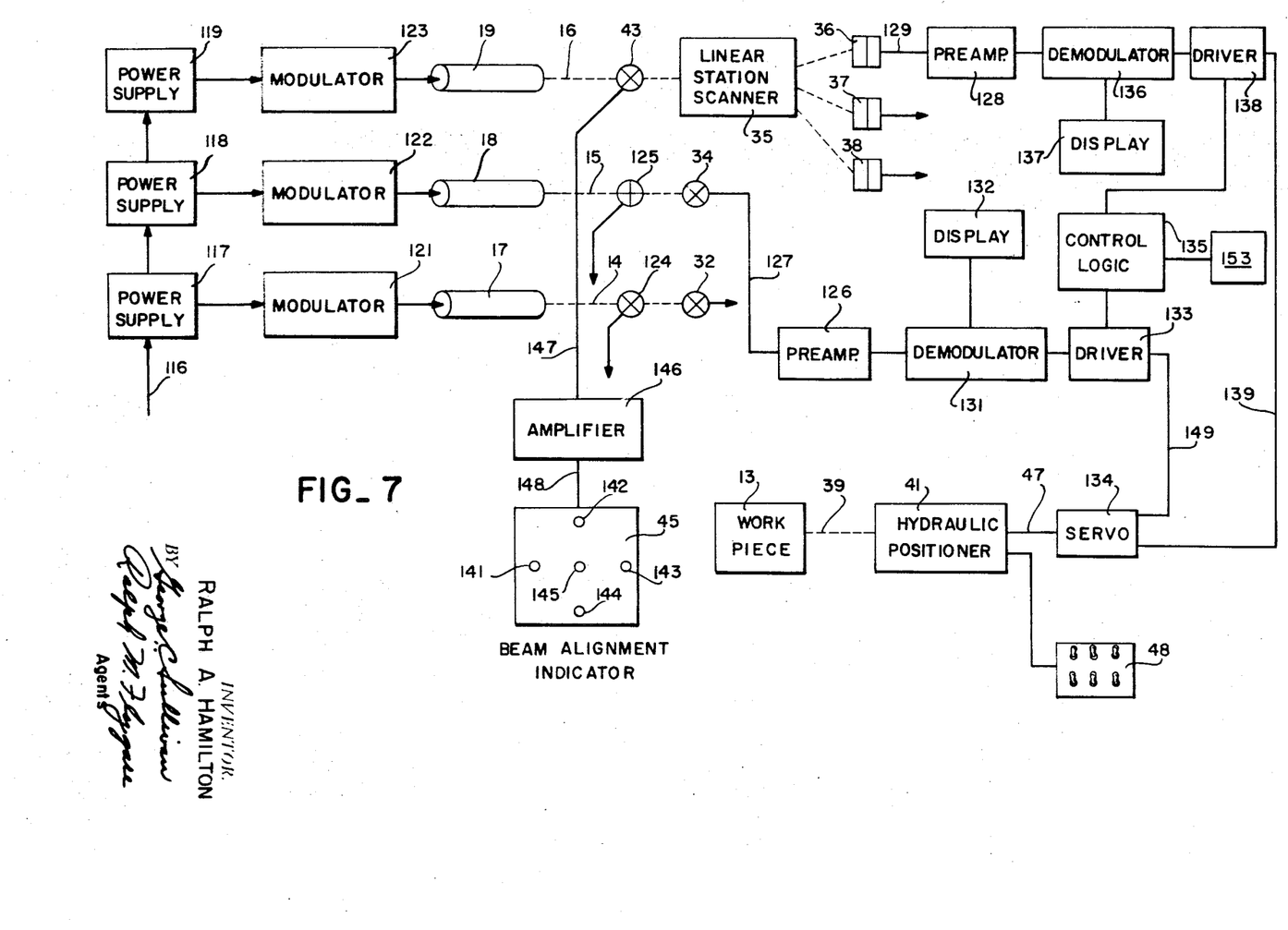

There is shown in FIG. 7 a block diagram of the overall automatic alignment system. Input power is applied to line 116 which energizes power supplies 117–119. The direct current outputs from power supplies 117–119 are supplied projectors 17–19 via modulators 121–123, respectively. These modulators (121–123) cyclically vary the intensity of the output laser beams 14–16 in the manner described previously. This permits discrimination against spurious and ambient light falling upon targets 32, 34, 43, 124 and 125, as well as targets 36–38.

Each quadrisector target provides four outputs which are amplified via a four-channel preamplifier. This arrangement is shown in FIG. 7 wherein the output of target 34 is supplied to preamplifier 126 via line 127. It should be understood that line 127 carries four channels of output data. For clarity, the preamplifiers associated with quadrisector targets 32, 124, and 125 have been omitted in FIG. 7. A dual-channel preamplifier 128 is connected to bisector target 36 via line 129. A similar arrangement is provided for targets 37 and 38 but has been omitted for clarity in FIG. 7. The amplified output from preamplifier 126 is an AC signal which is demodulated by demodulator 131 to provide a DC signal for operating a suitable display device 132. Also, the demodulated output is supplied via driver amplifier 133 to the servo 134 and the control logic 135.

A similar arrangement is provided for the bisector targets 36–38. A typical arrangement is shown for target 36 wherein the amplified AC output from preamplifier 128 is converted to a DC analog by demodulator 136 and supplied to driver amplifier 138 and display 137. The output from driver amplifier 138 is also supplied to servo 134 and control logic 135.

The display devices 132 and 137 may comprise any suitable indicator arrangement and in a preferred embodiment comprise panel meters such as indicated at 132' and 137' in FIG. 2.

In a practical construction, six "zero center" meters are provided to display errors or zero for all six possible movements of the fitting or component 13. The apparatus can be adjusted so that the meter divisions read directly in thousandths of an inch of displacement of target to beam.

Output cable 47 from servo 134 carries control signals to the hydraulic positioner 41. The mechanical linkage comprising arm 39 and bar 79 is secured to the workpiece or component 13 for physical positioning.

The beam alignment indicator 45 comprises a small box having dimensions which will permit it to be manually held by the operator. This box is provided with five indicator lamps 141–145. The indicator 45 is electrically connected to a selected quadrisector target, such as target 43, through a four channel amplifier-indicator circuit 146 which is interposed between lines 147 and 148. When beam 16 is exactly centered on target 43, indicator lamp 145 will be lighted. In the event that the beam 16 moves off center and onto one of the four sectors of the target 43, then a corresponding one of the four lamps 141–144 will be lighted to indicate to the operator the direction of off axis displacement of the beam 16 with respect to the target 43. This permits precision manual pointing of the laser projectors when it is not possible for the operator to view the display meters of the console 42.

The output voltage amplitude of each target sector, as it appears at the output of its related amplifier, is directly proportional to the area of target sector illumination. For example, if the laser beam falls mostly on the upper quadrant of the target, with some light impinging on the remaining three quadrants, the output from the upper quadrant amplifier will be greater than from the other three amplifiers. This voltage difference is processed via the control logic circuits (135) to generate an electrical command on line 139 or line 149 which will direct the hydraulic positioner 41 to lift the fitting and the attached target upwardly. This movement will bring the target to a position where the laser beam spot falls equally between the upper and lower quadrant sectors. The "up" and "down" amplifiers will then produce equal output voltages, the comparing and logic circuits will respond to an electrical balance, and all movement of the hydraulic positioner 41 ceases. This sequence of events occurs for the basic target 124 (as shown in FIGS. 2 and 7).

A bisector target 125 is used in the auxiliary line of sight but is rotated 45 degrees as compared with the above-described basic target (124). This auxiliary target 125 is used to control axial rotation. The rotational position of the bisector of target 125 provides a vertical line with semicircular target sectors on each side for controlling left-hand or right-hand movement of the component 13 at this upper position, as seen from the laser projector end of the jig (21).

The jig fitting or component 13 is first rough located and then clamped to the positioning bar 79 of the hydraulic positioner 41. The bisensor targets 36–38 are then secured to the component 13 at appropriate positions and their electrical outputs (via lines 69, 71 and 72) are connected to the control unit through a suitable interconnecting cable.

Each bisensor target (36–38) generates displacement error signals which are supplied to the comparing and logic circuits in console 42 which control the hydraulic positioner 41. The control outputs direct the positioner 41 to make the necessary motions to bring the component 13 and the attached targets 36–38 into a zero or normal position.

Bisector linear station targets 36–38 need have only two sectors since it is only necessary to determine whether the component 13 is either fore or aft of the station plane generated by the sweep of beam 16, normal to the axis of beams 14 and 15. The station plane, generated by beam 16 is positioned precisely at the linear station and when the bisector targets (36–38) are aligned therewith, the electrical output form both sectors of any given target will be equal. The targets are clamped to the station face of the component 13, and to facilitate calibration the dividing line between the two target sectors is displaced exactly one inch from the fitting station face position. To accommodate this fixed position the scanner 35 is also located to scan 1.000 inch from the fitting station face position.

The linear stations are measured along the basic line of sight 14 and the station planes are perpendicular to the line of sight 14. This is not always the direction of measurement of distances between linear stations; however, beam 16 as it emerges from its projector should be perpendicular to the linear stations and the laser projector 19 should be attached to the jig frame 21 in such a position that it is free of the working areas.

As stated previously, fixed beam 16 is turned exactly 90° by the pentaprism in linear station scanner 35 and then swept or scanned in a station plane to be sensed by the bisector targets clamped to the face of the component 13. The station position of the linear station being scanned is determined by the physical location of the scanner 35 with respect to the portable tooling bar 31, which in turn is attached by shoulder screws to the jig frame 21 in predetermined master station positions (77).

The three linear station targets 36–38 are so arranged on the component 13 that one target (e.g. 37) will produce the linear displacement control signals, another (e.g. 38) will produce the horizontal rotation control signals, and the third (e.g. 36) the vertical tilt control signals.

The movement of the component 13 by a given servo actuator, in response to an error signal generated by a corresponding target, will produce some interaction with the other targets and therefore there will be corresponding movements by the remaining servo actuators. As a result, it is necessary to plan the association of actuators and targets for each individual set up so that the given target, receiving the laser beam, will move a greater distance than all the remaining targets. Otherwise, the component 13 would follow an undamped oscillatory movement and never arrive at a zero position.

A switch 153 is provided on the console 42 to change the operating mode of the system from "manual" to "automatic." The manual mode permits the hydraulic positioner 41 to be operated by means of manually controlled switches on remote-control box 48. There is provided one switch position for each of the six degrees of freedom, thus permitting an operator to move the component 13, under powered drive, into rough alignment wherein the laser beams 14–16 impinge somewhere on the targets, as is required to initiate automatic control. After the rough alignment has been accomplished by the operator, switch 153 is transferred to the automatic mode condition.

During automatic positioning of the component 13 all physical positioning and holding is accomplished by the servo actuators of the hydraulic positioner 41 and when the correct location has been achieved, the component 13 is secured to the jig frame 21. This may be accomplished by pouring a liquid "tooling stone" into the attachment pot 78 secured to base member 22 and surrounding the tang 82. Solidification of the tooling stone secures the component 13 to the jig frame 21. The hydraulic positioner 41 holds the component for approximately 15 minutes, during which time the automatic controls (42) are switched to the holding position. This gives time for the tooling stone to harden.

The hydraulic positioner bar 79 is then unclamped from the component 13 and the positioner 41 is moved to the place at which the next component, or fitting is to be located.

The following steps summarize the above-described procedure for setting up the system and implementing its automatic operating mode:
1. The three laser projectors 17–19 are aligned to their associate reference targets 32, 34 and 43, respectively.
2. The linear station scanner 35 is secured to the linear increment bar 31 at the desired linear station.
3. The scanner 35 is adjusted so that its rotational axis is perpendicular and parallel to laser beam 16 and at the appropriate linear station.
4. The component 13 is secured to the bar 79 of the hydraulic positioner 41.

5. Targets 124 and 125 are temporarily attached to the component 13; similarly, the three linear station targets 36–38 are properly positioned and temporarily attached to the component 13.
6. By means of the manual controls on the remote control box 48 and the console meters (e.g. 132', 137') the component 13 is positioned so that all of the active targets are receiving corresponding ones of laser beams 14–16.
7. The system is then switched to the automatic mode by means of switch 153 on console 42 and thereafter the hydraulic positioner 41 controls the motion of the component 13 to automatically align, and thereafter maintain the alignment of, the component 13 with respect to the jig frame 21.
8. The component 13 is then permanently secured to the jig frame 21.

Thereafter the arm 79 of the hydraulic positioner may be unclamped from the component 13 and moved to the location of the next fitting or component to be located.

From the foregoing it will be seen that there is provided by the present invention a novel and improved system for precisely locating a part in space with respect to orthogonally intersecting planes, and at a given distance from the origin of their intersection.

What is claimed is:

1. Automatic alignment apparatus comprising: means for projecting first, second, and third light beams defining orthogonally intersecting horizontal, vertical, and station planes;
    an object movable through six degrees of freedom to be aligned selectively with respect to said planes;
    first means, secured to said object for movement therewith, responsive to said first beam to produce horizontal and vertical displacement control signals indicative of the relative position of said first means with respect to the intersection of said horizontal and vertical planes;
    second means secured to said object for movement therewith, responsive to said second beam to produce rotational control signals indicative of rotation of said object in said station plane; and
    third means secured to said object for movement therewith responsive to said third beam to produce control signals respectively indicative of rotation in said vertical plane, rotation in said horizontal plane, and linear displacement along the intersection of said horizontal and vertical planes, of said object.

2. Automatic alignment apparatus as defined in claim 1 wherein said light beam projecting means comprises a plurality of lasers.

3. Automatic alignment apparatus as defined in claim 1 wherein said first, second, and third beam responsive means comprise photoelectric targets.

4. Automatic alignment apparatus as defined in claim 1 including means for sweeping said third light beam so as to generate said station plane.

5. Automatic alignment apparatus as defined in claim 1 including positioning means responsive to said control signals for moving said object to a selected locus with respect to said planes.

6. Automatic alignment apparatus as defined in claim 5 including:
    a plurality of servo drive means responsive to corresponding ones of said control signals to generate corresponding servo drive signals; and wherein said positioning means comprises;
    servo positioning means responsive to said servo drive signals for moving said beam responsive means into alignment with corresponding ones of said beams and thereby align said object with respect to said locus.

7. Automatic alignment apparatus as defined in claim 1 including:
    means associated with said light beam-projecting means for modulating said beams; and demodulator means connected to said beam responsive means to provide said control signals in response to said modulated beams, whereby said apparatus is made insensitive to ambient radiant energy.

8. Automatic alignment apparatus as defined in claim 1 wherein said first and second beam-projecting means project stationary beams and said third beam-projecting means projects a moving beam which sweeps through an arc in a single plane.

9. Automatic alignment apparatus comprising:
    laser means for projecting first, second, and third light beams defining three orthogonally intersecting planes;
    an object movable through six degrees of freedom to be aligned selectively with respect to said planes;
    a quadrisector photoelectric target, secured to said object for movement therewith responsive to said first beam to produce horizontal and vertical displacement control signals indicative of the relative position of the center of said target, in one of said planes, with respect to the axis of said first beam;
    a first bisector photoelectric target, secured to said object for rotational movement therewith, responsive to said second beam to produce a rotational control signal indicative of rotation of said object in said one plane about the axis of said first beam; and
    a second bisector photoelectric target secured to said object for movement therewith, responsive to said third beam to produce control signals respectively indicative of the vertical rotation in said one plane, horizontal rotation in said one plane, and linear displacement along the axis of said first beam, of said object.

10. Automatic alignment apparatus as defined in claim 9 including:
    positioning means responsive to said control signals for moving said object to a selected locus with respect to said intersecting planes.

11. Automatic alignment apparatus as defined in claim 10 including:
    indicator means responsive to said control signals for visually displaying the relative position of said object with respect to said locus.

12. Automatic alignment apparatus comprising:
    a plurality of laser beam projectors, the projected beams of which define intersecting reference planes;
    a selectively movable object to be aligned with respect to said planes and located with respect to the point of intersection of said reference planes;
    a plurality of photoelectric target means, each of which is responsive to a corresponding one of said beams to produce corresponding control signals, said target means being secured to said object for movement therewith;
    positioning means drivingly coupled to said object for selectively moving said object through six degrees of freedom; and
    control means connected to said positioning means and responsive to said control signals for causing said positioning means to locate said object at a selected locus with respect to said point of intersection and to align said object in a selected attitude with respect to said planes.

13. Automatic alignment apparatus as defined in claim 12 including:
    means associated with said laser beam projectors for modulating said beams; and
    demodulator means connected to said photoelectric target means to produce said control signals in response to the impingement of said modulated beams on said target means, whereby said apparatus is made insensitive to ambient radiant energy.

14. Automatic alignment apparatus as defined in claim 12 including:
    means associated with one of said projectors for sweeping the beam projected therefrom through an arc to generate a corresponding one of said reference planes.

15. Automatic alignment apparatus as defined in claim 12 including:
- a frame to which said projectors are secured; and
- means for attaching said object to said frame when said positioning means and said control means have located said object at said selected locus.

16. Automatic alignment apparatus as defined in claim 15 including:
- a plurality of sensor means secured to said frame, each of which is responsive to a corresponding one of said beams for indicating the axis thereof.

17. The combination comprising:
- means for projecting a substantially collimated beam of radiation;
- optical means interposed in the path of said beam for diverting said beam to at least two loci in space and thereby define a fixed reference plane;
- first and second radiation sensitive means, each having an optical center, for producing control signals in response to radiation applied thereto by said optical means; and
- servo means responsive to said control signals and drivingly coupled to said first and second radiation sensitive means for automatically, and simultaneously, aligning said optical centers with respect to said reference plane.

18. The combination defined in claim 17 wherein said optical means comprises:
- a pentaprism; an
- means drivingly coupled to said pentaprism for rotation thereof about its optical axis.

19. The combination defined in claim 17 wherein each of said radiation sensitive means produces a first control signal when said reference plane falls on one side of said optical center and a second control signal when said reference plane falls on the other side of said optical center.

20. The combination defined in claim 17 wherein said beam projecting means comprises an intensity-modulated, continuous-wave laser.